(12) United States Patent
Chard et al.

(10) Patent No.: US 8,013,763 B2
(45) Date of Patent: *Sep. 6, 2011

(54) METHOD AND APPARATUS FOR UNIT INTERVAL CALCULATION

(75) Inventors: Gary F. Chard, Garland, TX (US); T-Pinn R. Koh, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/970,408

(22) Filed: Dec. 16, 2010

(65) Prior Publication Data

US 2011/0085631 A1    Apr. 14, 2011

Related U.S. Application Data

(63) Continuation of application No. 12/432,148, filed on Apr. 29, 2009, now Pat. No. 7,876,242.

(51) Int. Cl.
*H03M 7/12* (2006.01)
(52) U.S. Cl. .......................... 341/70; 348/465
(58) Field of Classification Search .................. 341/70; 348/465, 464, 478, 365, 468, 461, 473; 702/120; 714/37, 735

See application file for complete search history.

(56) References Cited

U.S. PATENT DOCUMENTS 7,876,242 B2 * 1/2011 Chard et al. ................. 341/70
2009/0027401 A1    1/2009 Loveridge et al.

FOREIGN PATENT DOCUMENTS

EP    1 473 695    11/2004

* cited by examiner

*Primary Examiner* — Joseph Lauture
(74) *Attorney, Agent, or Firm* — John J. Patti; Wade J. Brady, III; Frederick J. Telecky, Jr.

(57) ABSTRACT

A method is provided. In this method, a clock signal and an input signal are received, where the input signal is a Manchester encoded signal. A unit interval (UI) number is incremented for each UI received upon receipt of a valid UI. The UI number is compared to a plurality of threshold values after the each increment of the UI number, where each threshold value is associated with at least one of a plurality of sum values. For each threshold value, once exceeded by the UI number, its sum value is incremented for each cycle of the clock signal, and a plurality of window lengths are calculated, where each window is calculated based at least in part on at least one of the sum values at predetermined values of the UI number.

20 Claims, 4 Drawing Sheets

METHOD AND APPARATUS FOR UNIT INTERVAL CALCULATION

CROSS-REFERENCE TO RELATED APPLICATIONS

This application is a continuation of U.S. patent application Ser. No. 12/432,148, entitled "METHOD AND APPARATUS FOR UNIT INTERVAL CALCULATION OF DISPLAYPORT AUXILIARY CHANNEL WITHOUT CDR," and filed on Apr. 29, 2009, which is incorporated by reference for all purposes.

TECHNICAL FIELD

The invention relates generally to asynchronous data transmission and, more particularly, to calculating unit intervals (UIs).

BACKGROUND

Figure 1:
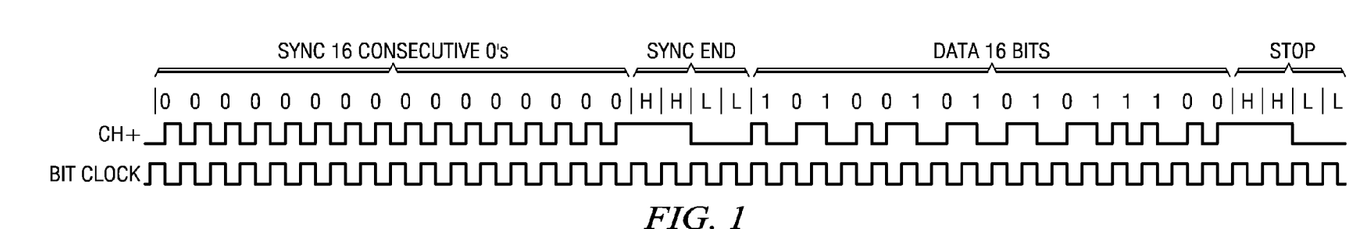
FIG. 1 is a timing diagram for a synchronization pattern and a stop condition for the DISPLAYPORT standard.

Referring to FIG. 1 of the drawings, a timing diagram for a Manchester-II encoded Auxiliary Channel synchronization pattern and stop condition for a DISPLAYPORT Standard v1.1a (Feb. 23, 2008) from the Video Electronics Standards Association (VESA), which is incorporated by reference herein for all purposes. In this Manchester-II encoding scheme, a transition from low to high corresponds to a "1," while a transition from high to low corresponds to a "0." As can be seen, the synchronization pattern is 16 consecutive zeros followed by a two bit high period (2 μs for a bit rate of 1 Mbps) and 2 bit low period (2 μs for a bit rate of 1 Mbps). Additionally, this synchronization pattern is preceded by 0 to 16 consecutive pre-charge "0's." This is done so that the common mode of the ac coupled clockless data lines settle before the actual transaction begins. Data transmission follows synchronization low period and is discontinued with the stop condition (a two bit high period followed by a two bit low period).

Since the Manchester-II encoded serial input is asynchronous, a decoder should be able to decode the data, independent of clock jitter and clock frequency variance. To accomplish this, however, a narrow unit interval (UI) is generally required by the DISPLAYPORT standard. In particular, a variance in UI width within a particular transaction is generally limited to ±5% of the width of the transaction; typically, for a nominal UI width of 0.5 μs, the window is generally between 0.4 μs to 0.6 μs. Due to the source clock variance used to generate the signal transaction relative to the asynchronous and highly process/voltage/temperature variable sampling clock, it can be difficult to distinguish between a synchronization pattern and a UI as well as between UI and 2UI. Additionally, one of the most difficult problems is to distinguish between a "sync-start-low" and 4UI's or 5UI's due to the lack of transition during the continuous low, which will generally determine which is the first bit of data. Another difficulty is the proper receipt of the Auxiliary transaction when determining the transmitted UI such that the transaction can be received properly is the variability in the number of pre-charge zeros seen by the receiver as well as the undesirable variability in the duration of the pre-charge zeros. Ideally, the pre-charge zeros are not used for UI calculation. It should be noted that improperly distinguishing any transmitted information will result in improper system operation and is highly undesirable. Therefore, there is a need for a highly reliable Manchester-II decoder implementation that is compatible with the DISPLAYPORT standard.

Some examples of conventional devices are U.S. Patent Pre-Grant Publ. No. 2009/0027401 and European Patent No. 1473695.

SUMMARY

A preferred embodiment of the present invention, accordingly, provides a method for decoding a Manchester-II encoded DISPLAYPORT compatible signal. The method comprises resetting a plurality of counters; incrementing a unit interval (UI) counter for each UI received upon receipt of a valid UI; comparing the value of the UI counter to a plurality of threshold values after the UI counter is incremented; when the value of the UI counter exceeds each of the threshold values, incrementing, for each clock cycle, a sum counter corresponding to the exceeded threshold value; and calculating a plurality of window lengths, wherein each window is calculated based at least in part on the value of one of the sum counters at predetermined values of the UI counter.

In accordance with a preferred embodiment of the present invention, the step of comparing further comprises comparing the value of the UI counter to 0, 8, 16, 24, and 32.

In accordance with a preferred embodiment of the present invention, the step of for each clock cycle, the sum counter corresponding to the exceeded threshold value further comprises: incrementing a first sum counter for each clock cycle if the value of the UI counter exceeds 0; incrementing a second sum counter for each clock cycle if the value of the UI counter exceeds 8; incrementing a third sum counter for each clock cycle if the value of the UI counter exceeds 16; incrementing a fourth sum counter for each clock cycle if the value of the UI counter exceeds 24; and incrementing a fifth sum counter for each clock cycle if the value of the UI counter exceeds 32.

In accordance with a preferred embodiment of the present invention, the step of calculating further comprises calculating a first window length by at least one of: dividing the value of the first sum counter by 32 when the value of the UI counter is 16; dividing the value of the second sum counter by 32 when the value of the UI counter is 24; dividing the value of the third sum counter by 32 when the value of the UI counter is 32; dividing the value of the fourth sum counter by 32 when the value of the UI counter is 40; and dividing the value of the fifth sum counter by 32 when the value of the UI counter is 48.

In accordance with a preferred embodiment of the present invention, the step of calculating further comprises calculating a second window length by at least one of: dividing the value of the first sum counter by 4 when the value of the UI counter is 18; dividing the value of the second sum counter by 4 when the value of the UI counter is 26; dividing the value of the third sum counter by 4 when the value of the UI counter is 34; dividing the value of the fourth sum counter by 4 when the value of the UI counter is 42; and dividing the value of the fifth sum counter by 4 when the value of the UI counter is 50.

In accordance with a preferred embodiment of the present invention, the step of calculating further comprises calculating a third window length by at least one of: dividing the value of the first sum counter by 8 when the value of the UI counter is 20; dividing the value of the second sum counter by 8 when the value of the UI counter is 28; dividing the value of the third sum counter by 8 when the value of the UI counter is 36; dividing the value of the fourth sum counter by 8 when the value of the UI counter is 44; and dividing the value of the fifth sum counter by 8 when the value of the UI counter is 52.

In accordance with a preferred embodiment of the present invention, the step of calculating further comprises calculating a fourth window length by at least one of: dividing the value of the first sum counter by 4 when the value of the UI counter is 22; dividing the value of the second sum counter by 4 when the value of the UI counter is 30; dividing the value of the third sum counter by 4 when the value of the UI counter is 38; dividing the value of the fourth sum counter by 4 when the value of the UI counter is 46; and dividing the value of the fifth sum counter by 4 when the value of the UI counter is 54.

In accordance with a preferred embodiment of the present invention, the step of calculating further comprises calculating a fifth window length by at least one of: dividing the value of the first sum counter by 16 when the value of the UI counter is 24; dividing the value of the second sum counter by 16 when the value of the UI counter is 32; dividing the value of the third sum counter by 16 when the value of the UI counter is 40; dividing the value of the fourth sum counter by 16 when the value of the UI counter is 48; and dividing the value of the fifth sum counter by 16 when the value of the UI counter is 56.

In accordance with a preferred embodiment of the present invention, the step of calculating further comprises calculating a first window length by at least one of: dividing the value of the first sum counter by 8 when the value of the UI counter is 28; dividing the value of the second sum counter by 8 when the value of the UI counter is 36; dividing the value of the third sum counter by 8 when the value of the UI counter is 44; dividing the value of the fourth sum counter by 8 when the value of the UI counter is 52; and dividing the value of the fifth sum counter by 8 when the value of the UI counter is 60.

In accordance with a preferred embodiment of the present invention, an apparatus for decoding a Manchester-II encoded DISPLAYPORT compatible signal is provided. The apparatus comprises a synchronizer that receives an input signal through an auxiliary channel; a data counter that receives an output from the synchronizer, wherein the data counter is adapted to store and update a one-counter value and a zero-counter value; and a bit counter having a UI counter and a plurality of sum counters; a state machine that receives the one-counter value, zero-counter value, and data from the data counter, wherein the state machine: increments the UI counter for each UI received upon receipt of a valid UI; compares the value of the UI counter to a plurality of threshold values after the UI counter is incremented; when the value of the UI counter exceeds each of the threshold values, increments, for each clock cycle, at least one of the sum counters corresponding to the exceeded threshold value; and calculates a plurality of window lengths, wherein each window is calculated based at least in part on the value of one of the sum counters at predetermined values of the UI counter.

In accordance with a preferred embodiment of the present invention, the state machine: increments a first sum counter of the plurality of counters for each clock cycle if the value of the UI counter exceeds a first threshold value; increments a second sum counter of the plurality of counters for each clock cycle if the value of the UI counter exceeds a second threshold value; increments a third sum counter of the plurality of counters for each clock cycle if the value of the UI counter exceeds a third threshold value; increments a fourth sum counter of the plurality of counters for each clock cycle if the value of the UI counter exceeds a fourth threshold value; and increments a fifth sum counter of the plurality of counters for each clock cycle if the value of the UI counter exceeds a fifth threshold value.

In accordance with a preferred embodiment of the present invention, the first, second, third, fourth, and fifth threshold values correspond to 0, 8, 16, 24, and 32, respectively.

In accordance with a preferred embodiment of the present invention, the state machine calculates a first window length by at least one of: dividing the value of the first sum counter by 32 when the value of the UI counter is 16; dividing the value of the second sum counter by 32 when the value of the UI counter is 24; dividing the value of the third sum counter by 32 when the value of the UI counter is 32; dividing the value of the fourth sum counter by 32 when the value of the UI counter is 40; and dividing the value of the fifth sum counter by 32 when the value of the UI counter is 48.

In accordance with a preferred embodiment of the present invention, the state machine calculates a first window length by at least one of: dividing the value of the first sum counter by 4 when the value of the UI counter is 18; dividing the value of the second sum counter by 4 when the value of the UI counter is 26; dividing the value of the third sum counter by 4 when the value of the UI counter is 34; dividing the value of the fourth sum counter by 4 when the value of the UI counter is 42; and dividing the value of the fifth sum counter by 4 when the value of the UI counter is 50.

In accordance with a preferred embodiment of the present invention, the state machine calculates a first window length by at least one of: dividing the value of the first sum counter by 8 when the value of the UI counter is 20; dividing the value of the second sum counter by 8 when the value of the UI counter is 28; dividing the value of the third sum counter by 8 when the value of the UI counter is 36; dividing the value of the fourth sum counter by 8 when the value of the UI counter is 44; and dividing the value of the fifth sum counter by 8 when the value of the UI counter is 52.

In accordance with a preferred embodiment of the present invention, the state machine calculates a first window length by at least one of: dividing the value of the first sum counter by 4 when the value of the UI counter is 22; dividing the value of the second sum counter by 4 when the value of the UI counter is 30; dividing the value of the third sum counter by 4 when the value of the UI counter is 38; dividing the value of the fourth sum counter by 4 when the value of the UI counter is 46; and dividing the value of the fifth sum counter by 4 when the value of the UI counter is 54.

In accordance with a preferred embodiment of the present invention, the state machine calculates a first window length by at least one of: dividing the value of the first sum counter by 16 when the value of the UI counter is 24; dividing the value of the second sum counter by 16 when the value of the UI counter is 32; dividing the value of the third sum counter by 16 when the value of the UI counter is 40; dividing the value of the fourth sum counter by 16 when the value of the UI counter is 48; and dividing the value of the fifth sum counter by 16 when the value of the UI counter is 56.

In accordance with a preferred embodiment of the present invention, the state machine calculates a first window length by at least one of: dividing the value of the first sum counter by 8 when the value of the UI counter is 28; dividing the value of the second sum counter by 8 when the value of the UI counter is 36; dividing the value of the third sum counter by 8 when the value of the UI counter is 44; dividing the value of the fourth sum counter by 8 when the value of the UI counter is 52; and dividing the value of the fifth sum counter by 8 when the value of the UI counter is 60.

In accordance with a preferred embodiment of the present invention, a method for decoding a Manchester-II encoded DISPLAYPORT compatible signal is provided. The method comprises resetting a plurality of counters; incrementing a unit interval (UI) counter for each UI received upon receipt of a valid UI; incrementing a first sum counter for each clock cycle if the value of the UI counter exceeds 0; incrementing a second sum counter for each clock cycle if the value of the UI counter exceeds 8; incrementing a third sum counter for each clock cycle if the value of the UI counter exceeds 16; incrementing a fourth sum counter for each clock cycle if the value of the UI counter exceeds 24; and incrementing a fifth sum counter for each clock cycle if the value of the UI counter exceeds 32; calculating a first window length by at least one of: dividing the value of the first sum counter by 32 when the value of the UI counter is 16; dividing the value of the second sum counter by 32 when the value of the UI counter is 24; dividing the value of the third sum counter by 32 when the value of the UI counter is 32; dividing the value of the fourth sum counter by 32 when the value of the UI counter is 40; and dividing the value of the fifth sum counter by 32 when the value of the UI counter is 48; calculating a second window length by at least one of: dividing the value of the first sum counter by 4 when the value of the UI counter is 18; dividing the value of the second sum counter by 4 when the value of the UI counter is 26; dividing the value of the third sum counter by 4 when the value of the UI counter is 34; dividing the value of the fourth sum counter by 4 when the value of the UI counter is 42; and dividing the value of the fifth sum counter by 4 when the value of the UI counter is 50; calculating a third window length by at least one of: dividing the value of the first sum counter by 8 when the value of the UI counter is 20; dividing the value of the second sum counter by 8 when the value of the UI counter is 28; dividing the value of the third sum counter by 8 when the value of the UI counter is 36; dividing the value of the fourth sum counter by 8 when the value of the UI counter is 44; and dividing the value of the fifth sum counter by 8 when the value of the UI counter is 52; calculating a fourth window length by at least one of: dividing the value of the first sum counter by 4 when the value of the UI counter is 22; dividing the value of the second sum counter by 4 when the value of the UI counter is 30; dividing the value of the third sum counter by 4 when the value of the UI counter is 38; dividing the value of the fourth sum counter by 4 when the value of the UI counter is 46; and dividing the value of the fifth sum counter by 4 when the value of the UI counter is 54; calculating a fifth window length by at least one of: dividing the value of the first sum counter by 16 when the value of the UI counter is 24; dividing the value of the second sum counter by 16 when the value of the UI counter is 32; dividing the value of the third sum counter by 16 when the value of the UI counter is 40; dividing the value of the fourth sum counter by 16 when the value of the UI counter is 48; and dividing the value of the fifth sum counter by 16 when the value of the UI counter is 56; and calculating a first window length by at least one of: dividing the value of the first sum counter by 8 when the value of the UI counter is 28; dividing the value of the second sum counter by 8 when the value of the UI counter is 36; dividing the value of the third sum counter by 8 when the value of the UI counter is 44; dividing the value of the fourth sum counter by 8 when the value of the UI counter is 52; and dividing the value of the fifth sum counter by 8 when the value of the UI counter is 60.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 2:
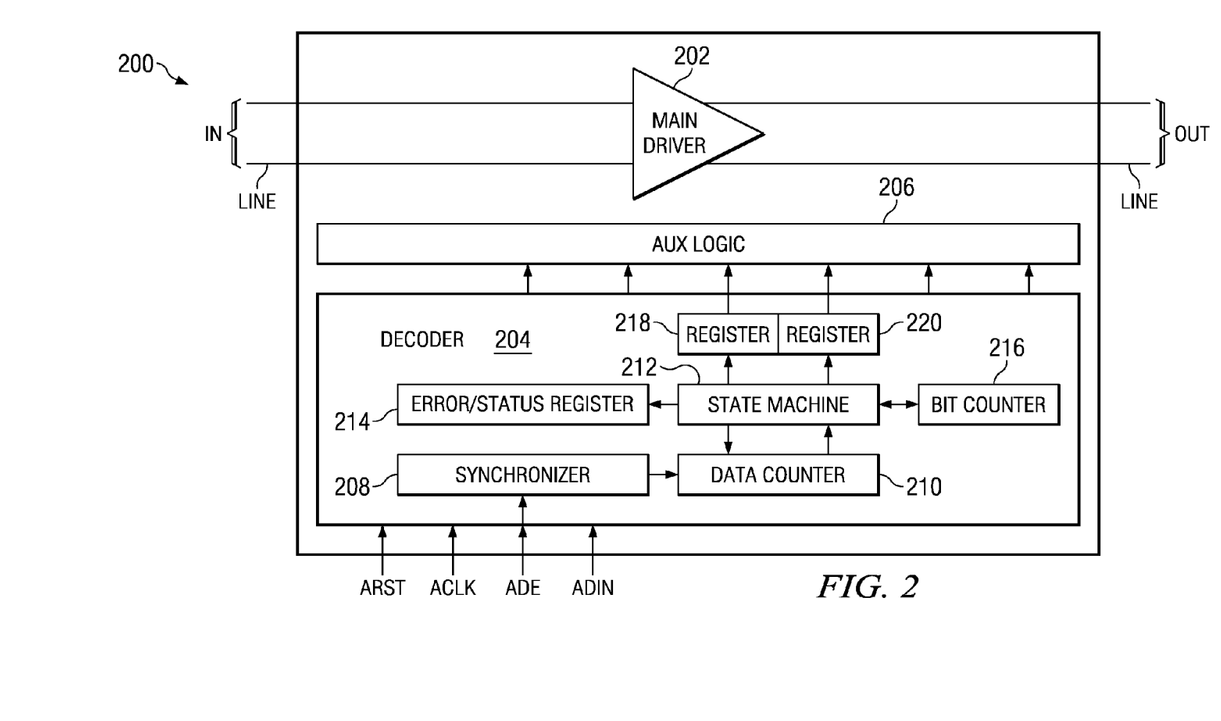
FIG. 2 is a block diagram of an example of a DIPLAYPORT compatible driver in accordance with a preferred embodiment of the present invention.

Referring to FIG. 2 of the drawings, the reference numeral 200 generally designates a driver in accordance with a preferred embodiment of the present invention. The driver 200 generally comprises a main driver 202 that receives data over a several main input channels IN and outputs data through several main output channels OUT. The driver 200 also includes circuitry that communicates over an auxiliary channel, namely, decoder 204 and auxiliary logic 206. The decoder 204 generally comprises a synchronizer 208, a data counter 210, a state machine 212, a bit counter 216, an error/status register 214, and registers 218 and 220. Preferably, the synchronizer 208 is generally comprised of flip-flops that are used to reduce the probability of the meta-stability due to the asynchronous inputs.

Figure 3:
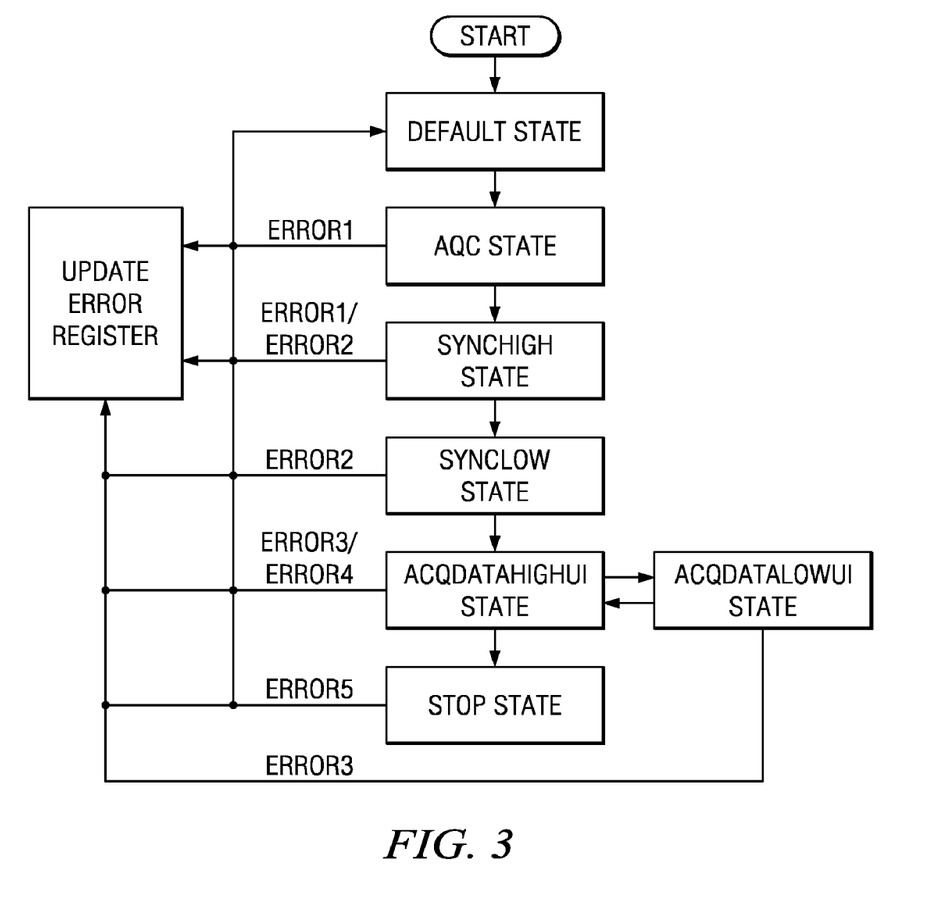
FIG. 3 is a flow chart of an example operation of the decoder for the driver of FIG. 2.

Turning to FIGS. 2 and 3, an example of the general operation of the decoder 204 can be seen. The decoder 204 begins in a default state DEFAULT when an enable signal ENA is asserted. In the default state DEFAULT (which is reflected in the error/status register 218), the state machine 212 clears its unit interval (UI) counter and its sum counters, and the state machine 212 monitors the output of data counter 210. Preferably, data counter 210 receives the auxiliary clock ACLK and input signal ADIN and is able to measure whether a valid UI is received. Data counter 210 does this by incrementing a one-counter value by one for each cycle of the auxiliary clock ACLK when the input signal ADIN is "1" and by incrementing a zero-counter value by one for each cycle of the auxiliary clock ACLK when the input signal ADIN is "0."

Based on the one-counter value, the zero-counter value, and the input signal ADIN, the state machine 212 can determine when to enter into an acquisition state ACQ. Preferably, the state machine 212 transitions from the default state DEFAULT to the acquisition state ACQ when: (1) the input signal is "1" and the zero-counter value is between a UI lower bond value and an UI upper bound value; or (2) the input signal is "0" and the one-counter value is between a UI lower bond value and an UI upper bound value. Both the IU upper bound value and the UI lower bound value are input into the decoder 204 based at least in part on the operating frequency jitter/variance across the entire operating time, corresponding to a signal UI bit duration. In the event that the one-counter value or the zero-counter value is outside of the interval between the UI upper bound value and the lower UI value, an error condition ERROR1 or an error in the receipt of a UI is determined (and recorded in error/status register 218), and the decoder 204 remains in the default state DEFAULT.

If the error condition ERROR1 is not present in the default state DEFAULT, the state machine 212 updates the error/status register 218 to reflect a change to acquisition state ACQ. In the acquisition state ACQ, the state machine 212 acquires the initial 28 UIs. Preferably, the state machine 212 acquires a set of 0.5UI, 1.5UI, 2.5UI, 3.5UI, 4.5UI, and 5.5 UI. At the same time, the state machine 212 determines whether the error condition ERROR1 is present. If the error condition ERROR1 is present, then the state machine 212 would revert back to the default state DEFAULT; otherwise, a synchronization state SYNCHIGH is assumed.

When the decoder 204 enters the synchronization state SYNCHIGH, the state machine 212 also updates the status/error register 214 to reflect the change in state. In the synchronization state SYNCHIGH, a determination is made as to whether the error condition ERROR1 is present. Also, a determination is made as to whether one-counter value is between a 5UI lower bound value and a 5UI upper bound value when the input signal is "0." Both the 5IU upper bound value and the 5UI lower bound value are input into the decoder 204 based at least in part on the operating frequency jitter/variance across the entire operating time, corresponding to a five UI bit duration. In the event that the error condition ERROR1 is present or the one-counter value is outside of the interval between the 5UI upper bound value and the lower 5UI value and a the sync signal SYNC is not asserted within 69 UIs (error condition ERROR2), the state machine reverts to the default state DEFAULT.

Figure 5:
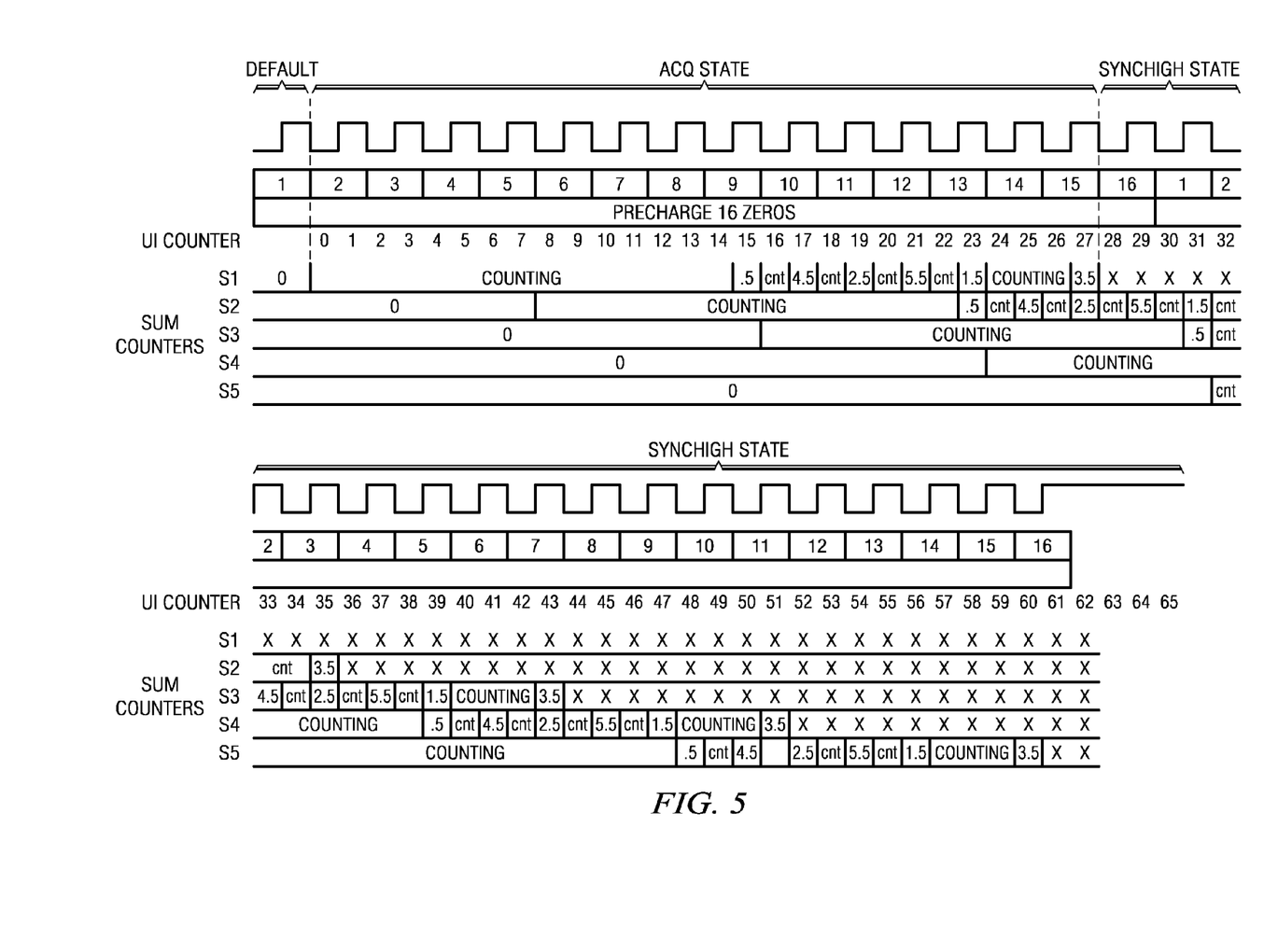
FIG. 5 is a timing diagram for an example of the unit interval (UI) calculations for the decoder of FIGS. 2 and 3.

When the state machine is in the acquisition state ACQ and the synchronization state SYNCHIGH state, the state machine 212 is able to obtain multiple UI counts without averaging, which can be seen in FIG. 5. For the DISPLAYPORT standard, the standard protocol calls for no more than 5 UIs without toggling. Ideally, counts are desirable at 0.5UI, 1.5UI, 2.5UI, 3.5UI, 4.5UI, and 5.5UI so that the data can be decoded without aliasing. Normally, for a single UI sample (even if averaged and for the case of 5.5UI), there will be an accumulated error of 5.5 times the round off error per UI, which is undesirable. Thus, to avoid this problem, the state machine 212 counts 0.5UI, 1.5UI, 2.5UI, 3.5UI, 4.5UI, and 5.5UI directly. To perform these counts in a digital domain for half-integer UIs, integers that are divisible by two, which are derived from sum counters and UI counter within the bit counter 216, are used to generally avoid a loss of resolution.

As can be seen in FIG. 5, state machine 212 uses one UI counter and five sum counters 51 through S5 to perform the counting. Initially, when the state machine 212 enters the acquisition state ACQ (or when the UI counter is at 0), sum counter S1 begins counting cycles of the auxiliary clock ACLK, while sum counters S2, S3, S4, and S5 begin counting when the UI counter is at 8, 16, 24, and 32, respectively. Preferably, when the UI counter reaches 32, sum counter S1 is cleared and reused as sum counter S5. The 0.5UI can then be updated by dividing the value of sum counter S1, S2, S3, S4, or S5 by 32 when the UI counter reaches 16, 24, 32, 40, or 48, respectively. By dividing by 32, the lower five bits of 0.5UI can be dropped. The 4.5UI can then be updated by dividing the value of sum counter S1, S2, S3, S4, or S5 by 4 when the UI counter reaches 18, 26, 34, 42, or 50, respectively. By dividing by 4, the lower two bits of 4.5UI can be dropped. The 2.5UI can then be updated by dividing the value of sum counter S1, S2, S3, S4, or S5 by 8 when the UI counter reaches 20, 28, 36, 44, or 52, respectively. By dividing by 8, the lower three bits of 2.5UI can be dropped. The 5.5UI can then be updated by dividing the value of sum counter S1, S2, S3, S4, or S5 by 4 when the UI counter reaches 22, 30, 38, 46, or 54, respectively. By dividing by 4, the lower two bits of 5.5UI can be dropped. The 1.5UI can then be updated by dividing the value of sum counter S1, S2, S3, S4, or S5 by 16 when the UI counter reaches 24, 32, 40, 48, or 56, respectively. By dividing by 16, the lower four bits of 1.5UI can be dropped. The 3.5UI can then be updated by dividing the value of sum counter S1, S2, S3, S4, or S5 by 8 when the UI counter reaches 28, 36, 44, 52, or 60, respectively. By dividing by 8, the lower three bits of 3.5UI can be dropped. As detailed above multiple overlapping sum counters S1 through S5 are employed, where the latest measurement would have priority over earlier measurements. Additionally, as the limit of the width of UI can generally be 7 bits, each of the sum counters S1 through S5 is generally 144 bits wide to count up to 28 UI widths. The UI counter may also count up to 69 UIs.

Turning back to FIGS. 3 and 4, the state machine 212 is able to decode the incoming Manchester-II encoded data using the window lengths. Following the synchronization state SYNCHIGH, the decoder 204 can enter a synchronization state SYNCLOW. In the synchronization state SYNCLOW, the UI counter and sum counters S1 through S5 are cleared, and the state machine 212 determines whether one of two conditions is present. Preferably, the state machine 212 determines whether one condition (synchronization followed by a "0") is satisfied by determining, for the input signal ADIN being a "1," whether the value of zero-counter is between the 5UI upper bound and 5UI lower bound and between the window lengths of 4.5UI and 5.5UI (which were calculated above). If this condition is satisfied, then the state machine 212 determines that there is a valid "synch-low," and the state machine reflects a change to acquisition state ACQDATAHIGH with an assigned carry bit of less than or equal to one. Preferably, the state machine 212 also determines whether the other condition (synchronization followed by a "1") is satisfied by determining, for the input signal ADIN being a "1," whether the value of zero-counter is between the 4 UI upper bound and 4UI lower bound and between the window lengths of 3UI and 4UI. If this second condition is satisfied, then the state machine 212 determines that there is a valid "synch-low," and the state machine reflects a change to acquisition state ACQDATAHIGHUI with no assigned carry bit. Otherwise, if neither the condition is satisfied, then the state machine reflects an error condition ERROR2 in the error/status register 214 and reverts to the default state DEFAULT.

Figure 4:
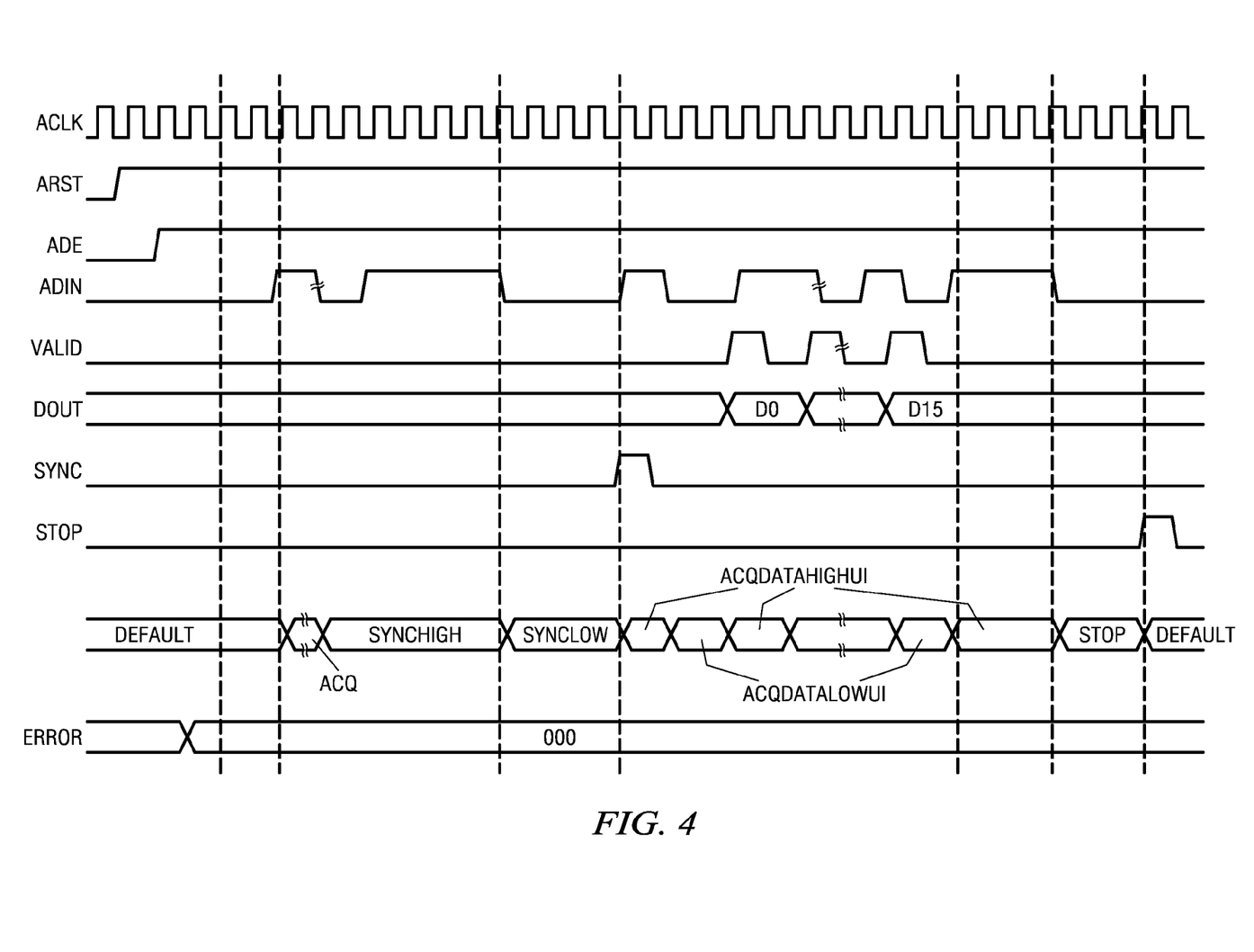
FIG. 4 is a timing diagram for the example operation of the decoder of FIG. 3.

In the acquisition states ACQDATAHIGHUI and ACQDATALOWUI, the state machine 212 decodes data input through the data counter 212. Preferably, the state machine 212 uses the window lengths of 0.5UI, 1.5UI, 2.5UI, 3.5UI, 4.5UI, and 5.5UI to determine whether valid data bits are present, which are transferred to or registered in registers 218 and/or 220, or whether there is a stop condition or an error. Valid data bits are generally registered in registers 218 and/or 220 in both acquisition states ACQDATAHIGHUI and ACQDATALOWUI, and after receiving 8 data bits, the state machine 212 asserts that valid data signal VALID for one cycle of the auxiliary clock ACLK.

In acquisition state ACQDATAHIGHUI, the state machine 212 determines whether one of four states is present (all when the input signal ADIN is "0"): "0" as a data bit before a stop condition; "1" as a data bit before a stop condition; a "01" as two successive data bits; or "11"/"00" as two successive data bits. To measure whether the first of these conditions is present, the state machine 212 determines whether the one-counter value is between 5UI lower bound and 5UI upper bound and between window lengths of 4.5UI and 5.5UI. Under this condition, a valid "stop-high" is present (which allows the state machine 212 to enter the stop state STOP), and a data bit (which is less than or equal to zero) corresponds to the carry bit. To measure whether the second of these conditions is present, the state machine 212 determines whether the one-counter value is between 4UI lower bound and 4UI upper bound and between window lengths of 3.5UI and 4.5UI. Under this condition, a valid "stop-high" is present (which allows the state machine 212 to enter the stop state STOP). To measure whether the third of these conditions is present, the state machine 212 determines whether the one-counter value is between 2UI lower bound and 2UI upper bound and between window lengths of 1.5UI and 2.5UI. Additionally, if the carry bit is "1," then the data bit is "0" or an error condition ERROR3 is present. Otherwise, under this condition, the state machine progresses to the acquisition state ACQDATALOWUI. To measure whether the fourth of these conditions is present, the state machine 212 determines whether the one-counter value is between UI lower bound and UI upper bound and between window lengths of 0.5UI and 1.5UI. Under this condition, a valid "0" as a data bit is present (which allows the state machine 212 to enter the acquisition state ACQDATALOWUI). If none of these conditions are present, an error condition ERROR4 is recorded in the error/status register 214, and the state machine 212 reverts to the default state DEFAULT.

In acquisition state ACQDATALOWUI, the state machine 212 determines whether one of two states is present (all when the input signal ADIN is "1"): two successive data bits are "10"; or two successive data bits are "11" or "00". To measure whether the first of these conditions is present, the state machine 212 determines whether the zero-counter value is between 2UI lower bound and 2UI upper bound and between window lengths of 1.5UI and 2.5UI. Additionally, if the carry bit is "1," then the data bit is "0" or an error condition ERROR3 is present. Otherwise, under this condition, the state machine 212 enters the acquisition state ACQDATAHIGHUI. To measure whether the second of these conditions is present, the state machine 212 determines whether the zero-counter value is between UI lower bound and UI upper bound and between window lengths of 0.5UI and 1.5UI. Under this condition, a valid "1" is present, and the state machine 212 enters the acquisition state ACQDATAHIGHUI. Otherwise, a error condition ERROR4 is noted in the error/status register 214, and the state machine 212 reverts back to the default state DEFAULT.

Error conditions may also be present in the stop state STOP. Preferably, for input signal ADIN being "0," the state machine 212 determines whether the zero-counter value is greater than 4UI lower bound and greater than 3.5UI and determines if the number of valid bit is seven. If these conditions are met, then a valid stop condition is present; otherwise, an error condition ERROR5 is noted in the error/status register 214, and the state machine 214 reverts back to the default state DEFAULT.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
receiving a clock signal and an input signal, wherein the input signal is a Manchester encoded signal;
incrementing a unit interval (UI) number for each UI received upon receipt of a valid UI;
comparing the UI number to a plurality of threshold values after the each increment of the UI number, wherein each threshold value is associated with at least one of a plurality of sum values;
for each threshold value, once exceeded by the UI number, incrementing its sum value for each cycle of the clock signal; and
calculating a plurality of window lengths, wherein each window is calculated based at least in part on at least one of the sum values at predetermined values of the UI number.

2. The method of claim 1, wherein the step of comparing further comprises comparing UI number to 0, 8, 16, 24, and 32.

3. The method of claim 2, wherein the step of for each threshold value, once exceeded by the UI number, incrementing its sum value for each cycle of the clock signal further comprises:
incrementing a first sum value for each cycle of the clock signal if the UI number exceeds 0;
incrementing a second sum value for each cycle of the clock signal if the UI number exceeds 8;
incrementing a third sum value for each cycle of the clock signal if the UI number exceeds 16;
incrementing a fourth sum value for each cycle of the clock signal if the UI number exceeds 24; and
incrementing a fifth sum value for each cycle of the clock signal if the UI number exceeds 32.

4. The method of claim 3, wherein the step of calculating further comprises calculating a first window length by at least one of:
dividing the first sum value by 32 when the value of the UI number is 16;
dividing the second sum value by 32 when the value of the UI number is 24;
dividing the third sum value by 32 when the value of the UI number is 32;
dividing the fourth sum value by 32 when the value of the UI number is 40; and
dividing the fifth sum value by 32 when the value of the UI number is 48.

5. The method of claim 3, wherein the step of calculating further comprises calculating a second window length by at least one of:
dividing the first sum value by 4 when the UI number is 18;
dividing the second sum value by 4 when the UI number is 26;
dividing the third sum value by 4 when the UI number is 34;
dividing the fourth sum value by 4 when the UI number is 42; and
dividing the fifth sum value by 4 when the UI number is 50.

6. The method of claim 3, wherein the step of calculating further comprises calculating a third window length by at least one of:
dividing the first sum value by 8 when the UI number is 20;
dividing the second sum value by 8 when the UI number is 28;
dividing the third sum value by 8 when the UI number is 36;

dividing the fourth sum value by 8 when the UI number is 44; and dividing the fifth sum value by 8 when the UI number is 52.

7. The method of claim 3, wherein the step of calculating further comprises calculating a fourth window length by at least one of:

dividing the first sum value by 4 when the UI number is 22;
dividing the second sum value by 4 when the UI number is 30;
dividing the third sum value by 4 when the UI number is 38;
dividing the fourth sum value by 4 when the UI number is 46; and
dividing the fifth sum value by 4 when the UI number is 54.

8. The method of claim 3, wherein the step of calculating further comprises calculating a fifth window length by at least one of:

dividing the first sum value by 16 when the UI number is 24;
dividing the second sum value by 16 when the UI number is 32;
dividing the third sum value by 16 when the UI number is 40;
dividing the fourth sum value by 16 when the UI number is 48; and
dividing the fifth sum value by 16 when the UI number is 56.

9. The method of claim 3, wherein the step of calculating further comprises calculating a first window length by at least one of:

dividing the first sum value by 8 when the UI number is 28;
dividing the second sum value by 8 when the UI number is 36;
dividing the third sum value by 8 when the UI number is 44;
dividing the fourth sum value by 8 when the UI number is 52; and
dividing the fifth sum value by 8 when the UI number is 60.

10. An apparatus comprising:

a data circuit that receives an input signal and a clock signal, wherein the input signal is a Manchester encoded signal; and
a bit circuit;
a state machine is coupled to data circuit and the bit circuit, wherein the state machine:
increments a UI number for each UI received upon receipt of a valid UI, wherein the UI number is stored in the bit circuit;
compares the UI number to a plurality of threshold values after the each increment of the UI number, wherein each threshold value is associated with at least one of a plurality of sum values, wherein the sum values are stored in the bit circuit;
for each threshold value, once exceeded by the UI number, increments its sum value for each cycle of the clock signal; and
calculates a plurality of window lengths, wherein each window is calculated based at least in part on at least one of the sum values at predetermined values of the UI number.

11. The apparatus of claim 10, wherein the state machine:
increments a first sum value for each clock cycle if the UI number exceeds a first threshold value;
increments a second sum value for each clock cycle if the UI number exceeds a second threshold value;
increments a third sum value for each clock cycle if the UI number exceeds a third threshold value;
increments a fourth sum value for each clock cycle if the UI number exceeds a fourth threshold value; and
increments a fifth sum value for each clock cycle if the UI number exceeds a fifth threshold value.

12. The apparatus of claim 11, wherein the first, second, third, fourth, and fifth threshold values correspond to 0, 8, 16, 24, and 32, respectively.

13. The apparatus of claim 12, wherein the state machine calculates a first window length by at least one of:

dividing the first sum value by 32 when the value of the UI number is 16;
dividing the second sum value by 32 when the value of the UI number is 24;
dividing the third sum value by 32 when the value of the UI number is 32;
dividing the fourth sum value by 32 when the value of the UI number is 40; and
dividing the fifth sum value by 32 when the value of the UI number is 48.

14. The apparatus of claim 12, wherein the state machine calculates a first window length by at least one of:

dividing the first sum value by 4 when the UI number is 18;
dividing the second sum value by 4 when the UI number is 26;
dividing the third sum value by 4 when the UI number is 34;
dividing the fourth sum value by 4 when the UI number is 42; and
dividing the fifth sum value by 4 when the UI number is 50.

15. The apparatus of claim 12, wherein the state machine calculates a first window length by at least one of:

dividing the first sum value by 8 when the UI number is 20;
dividing the second sum value by 8 when the UI number is 28;
dividing the third sum value by 8 when the UI number is 36;
dividing the fourth sum value by 8 when the UI number is 44; and
dividing the fifth sum value by 8 when the UI number is 52.

16. The apparatus of claim 12, wherein the state machine calculates a first window length by at least one of:

dividing the first sum value by 4 when the UI number is 22;
dividing the second sum value by 4 when the UI number is 30;
dividing the third sum value by 4 when the UI number is 38;
dividing the fourth sum value by 4 when the UI number is 46; and
dividing the fifth sum value by 4 when the UI number is 54.

17. The apparatus of claim 12, wherein the state machine calculates a first window length by at least one of:

dividing the first sum value by 16 when the UI number is 24;
dividing the second sum value by 16 when the UI number is 32;
dividing the third sum value by 16 when the UI number is 40;
dividing the fourth sum value by 16 when the UI number is 48; and
dividing the fifth sum value by 16 when the UI number is 56.

18. The apparatus of claim 12, wherein the state machine calculates a first window length by at least one of:

dividing the first sum value by 8 when the UI number is 28;
dividing the second sum value by 8 when the UI number is 36;
dividing the third sum value by 8 when the UI number is 44;
dividing the fourth sum value by 8 when the UI number is 52; and
dividing the fifth sum value by 8 when the UI number is 60.

19. The apparatus of claim 12, wherein the apparatus further comprises a synchronizer that is coupled to the data circuit, wherein the synchronizer receives and synchronizes the input signal.

20. The apparatus of claim 19, wherein the synchronizer further comprises a plurality of flip-flops.

* * * * *